United States Patent [19]
Funahashi et al.

[11] Patent Number: 6,097,548
[45] Date of Patent: Aug. 1, 2000

[54] DEVICE FOR DETECTING ZOOM LENS POSITIONS AND APPARATUS EMPLOYING THE DEVICE

[75] Inventors: Akira Funahashi, Sakai; Takahiro Ikeda; Hidekazu Nakajima, both of Kawachinagano, all of Japan

[73] Assignee: Minolta Co., Ltd., Osaka, Japan

[21] Appl. No.: 09/172,276

[22] Filed: Oct. 14, 1998

[30] Foreign Application Priority Data

Oct. 14, 1997 [JP] Japan ................................ 9-280347

[51] Int. Cl.⁷ .................................................. G02B 15/14
[52] U.S. Cl. ......................... 359/694; 359/696; 396/80; 396/87
[58] Field of Search .................... 359/696, 694; 396/80, 87

[56] References Cited

U.S. PATENT DOCUMENTS

| | | | |
|---|---|---|---|
| 5,144,491 | 9/1992 | Ushiro et al. | 359/697 |
| 5,223,873 | 6/1993 | Tsuboi | 354/199 |
| 5,655,159 | 8/1997 | Nakayama et al. | 396/84 |
| 5,897,227 | 4/1999 | Haraguchi et al. | 396/80 |

FOREIGN PATENT DOCUMENTS 63-287833A 11/1988 Japan.

*Primary Examiner*—Georgia Epps
*Assistant Examiner*—Tim Thompson
*Attorney, Agent, or Firm*—Burns, Doane, Swecker & Mathis, LLP

[57] ABSTRACT

A detecting mechanism for detecting a position of a zoom lens used in a camera, in which the same signal is output at each of a plurality of locations through which the lens passes, and in which it is possible to execute a resetting operation of the lens with a lesser mechanical load being exerted upon the lens at both ends of a region within which the lens is driven to move. The mechanism includes a position detection switch that outputs signals of "ON" and "OFF" alternately along a direction in which the lens is driven to move. The switch outputs the signal of "ON" when the lens is on one end of the region, and outputs the signal of "OFF" when the lens is on the other end thereof. When the switch is "ON" at time of the resetting operation, the lens is driven towards the other end thereof, and when the switch is "OFF" at time thereof, the lens is driven towards the one end. This mechanism prevents the lens from striking or hitting on each end of the region.

18 Claims, 9 Drawing Sheets

DEVICE FOR DETECTING ZOOM LENS POSITIONS AND APPARATUS EMPLOYING THE DEVICE

This application is based on application No. 09-280347 filed Oct. 14, 1997 in Japan, the contents of which are hereby incorporated by reference.

BACKGROUND OF THE INVENTION

1. Field of the Invention

The present invention relates to an optical apparatus, such as a camera including a digital camera, a video camera and a television camera which are used for a number of purposes, and particularly relates to a detector for detecting a position of a zoom lens with which the optical apparatus is provided.

2. Description of the Related Arts

In a camera in which a zoom lens is driven by a motor, it is necessary to perform a resetting operation for detecting a state of the zoom lens, for example when a position of a lens barrel forwarded from a body of the camera becomes unclear due to a loading and unloading of a battery into the camera.

For example, at time of performing the resetting operation, the detection is performed so that the zoom lens is driven until it mechanically contacts a barrel collapse end or a telephoto side end, and so that the mechanical contacting state is detected by a change, for example, of amount of rotation of the motor.

However, this resetting method for detecting the state of the zoom lens is not preferable because a greater load is exerted on the lens barrel and/or the zoom driving system.

On the other hand, another resetting method for detecting the state of the zoom lens is a method based upon a device in which there is mounted a switch that is able to detect the exact position of the zoom lens. According to the method, at time of performing the resetting operation, the position or the state, of the zoom lens, is detected by the switch.

However, this method requires a special switch and an additional space for accommodating the special switch inside a camera body, which causes the camera body to be larger necessarily and therefore causes its manufacturing cost to be higher.

On the other hand, in order to realize a miniaturization of the zoom lens and to realize a reduction of its manufacturing cost thereof, conventionally, there has been provided a zoom lens with a cam for moving a plurality of lenses thereof in which a plurality of focusing regions and zooming regions are arranged alternately to perform its zooming operation stepwise. According to this construction, it is possible to accomplish the zooming and focusing operations alternately without a particular focusing mechanism.

In this type of zoom lens, a detector (or a switch) to detect each reference position (or each standard position) of the lenses thereof for focusing at each zooming step, is required. In this construction, to provide a separate switch at each step is, however, disadvantageous, in view of a large space needed to accommodate such separate switches therein, and in view of a higher manufacturing cost necessarily incurred thereby. In this respect, therefore, it is advantageous to employ a single detector (or a switch) that is able to detect each position of the lenses of the zoom lens at each zooming step.

However, in case that such a single detector is employed therein, the same detection signal is outputted from the detector at a plurality of different zooming steps. Therefore, in this construction, it is not possible to specify each state, or each condition, of the zoom lens immediately at each step thereof.

Accordingly, in the construction, it is not easy to perform the resetting operation of the lenses of the zoom lens.

SUMMARY OF THE INVENTION

Accordingly, it is an object of the present invention to provide an optical apparatus, such as a camera, with a zoom lens a position of which is detected by a detector for detecting the position thereof, in which the detector outputs a same detection signal at each different position of the zoom lens, and in which the detector allows a resetting operation of the zoom lens to be performed with a lesser mechanical load, of the zoom lens, being exerted upon both extremities or both ends (namely, a barrel collapse end and a telephoto side end), between which the zoom lens is driven to move.

In accomplishing this and other objects of the present invention, in one aspect thereof, there is provided an apparatus comprising: a driving device that drives a zoom lens; a position detector that outputs a detection signal of ON and a detection signal of OFF alternately in correspondence with a position of the zoom lens; and a controller that controls the driving device in correspondence with the detection signal output from the position detector, wherein the controller controls the driving device to reset the zoom lens to an initial position thereof, so that the driving device drives the zoom lens in a first direction when the position detector outputs the detection signal of ON, and so that the driving device drives the zoom lens in a second direction when the position detector outputs the detection signal of OFF.

According to the construction, depending upon the detection signal of ON or OFF that is detected at time of the resetting operation of the zoom lens, the direction in which the zoom lens is initially driven to move differs.

In the construction, preferably, the position detector outputs the detection signal of ON when the zoom lens is positioned on one of end parts of a field within which the zoom lens is driven to move, and wherein the position detector outputs the detection signal of OFF when the zoom lens is positioned on the other of end parts thereof.

According to the construction, even if the zoom lens is positioned on either end part of the field within which the zoom lens is driven to move, the zoom lens starts to be driven to move towards its opposite end part thereof on a basis of the ON or OFF detection signal output from the position detector when the zoom lens is initially driven to execute the resetting operation of the zoom lens. That is, with the construction, it is possible to carry out the resetting operation of the zoom lens without exerting a mechanical load upon the zoom lens at time of the initial drive of the zoom lens.

Alternatively, the position detector may output the detection signal of one of ON and OFF when the zoom lens is positioned on one of end parts of the field within which the zoom lens is driven to move, and wherein the position detector may output the detection signal of the one thereof when the zoom lens is positioned on the other of end parts thereof.

In the construction, preferably, the controller controls the driving device so as to drive the zoom lens at a relatively low speed for resetting the zoom lens to the initial position thereof, when the zoom lens is positioned on the end part of the field within which the zoom lens is driven to move and when the position detector outputs the detection signal of the one of ON and OFF, and wherein the controller controls the driving device so as to drive the zoom lens at a relatively high speed for resetting the zoom lens to the initial position thereof, when the position detector outputs the detection signal which indicates that the zoom lens is not positioned on the end part of the field.

According to the construction, even if the zoom lens is positioned on either end part of the field within which the zoom lens is driven to move, the zoom lens starts to be driven to move in a same direction on a basis of the same ON or OFF detection signal output from the position detector when the zoom lens is initially driven to execute the resetting operation of the zoom lens.

Therefore, in case that the zoom lens is positioned, at time of the resetting operation thereof, on one end part of the field within which the zoom lens is driven to move, the zoom lens starts to be initially driven towards the other end part thereof so that the zoom lens does not reach the one end part thereof; namely, it is possible to prevent any mechanical load from being exerted upon the zoom lens.

On the other hand, in case that the zoom lens is positioned, at time of the resetting operation thereof, on the other end part of the field within which the zoom lens is driven to move, the zoom lens strikes or hits on the same other end part. However, the zoom lens is driven at the relatively low speed for resetting the zoom lens to the initial position thereof. Therefore, it is possible to prevent the zoom lens from striking or hitting hard at the other end part thereof, and thus it is possible to prevent any large mechanical load from being exerted upon the zoom lens.

On the other hand, in case that the zoom lens is positioned, at time of the resetting operation, between the two end parts of the field within which the zoom lens is driven to move, the zoom lens is driven at the relatively high speed. Therefore, the resetting operation of the zoom lens is carried out speedily, as a whole.

According to another aspect of the present invention, there is provided an apparatus comprising: a driving device that drives a zoom lens; a position detector that outputs an ON signal and an OFF signal alternately in correspondence with a position of the zoom lens, wherein the position detector outputs the ON signal at one of end parts of a moving field within which the zoom lens is moved, and wherein the position detector outputs the OFF signal at the other of end parts thereof; and a controller that controls the driving device so as to execute an operation for resetting the zoom lens to an initial stand-by position thereof, in response to the ON signal and the OFF signal which are output from the position detector.

According to still another aspect of the present invention, there is provided an apparatus comprising: a zoom lens that is driven along: a first position, in a direction in which the zoom lens is driven, at which the zoom lens is retracted inside a body of the apparatus and at which the zoom lens is in an unusable state, a second position, in the direction, at which the zoom lens is forwarded outside from the first position, wherein the second position corresponds to one of extremities in a usable state of a region within which the zoom lens is movable, and a third position, in the direction, at which the zoom lens is further forwarded outside from the second position, wherein the third position corresponds to the other of extremities in the usable state thereof, wherein the zoom lens can take the first position and an arbitrary position between the second position and the third position; a driving device for driving the zoom lens in the direction; a position detector for outputting an ON signal and an OFF signal alternately when the zoom lens is driven between the second position and the third position by the driving device; and a controller for controlling the driving device in response to the ON signal and the OFF signal that are output from the position detector, so as to reset the zoom lens to an initial position thereof, wherein the position detector keeps outputting one of the ON signal and the OFF signal when the zoom lens is located between the first position and a region including the second position by the driving device, and wherein an outputting region in which the position detector keeps outputting the one thereof is sufficiently larger than an outputting region in which the position detector keeps outputting each of the ON signal and the OFF signal when the zoom lens is driven between the second position and the third position.

In the construction, it is possible to determine whether or not the zoom lens is located in the region between the first and second positions by comparing a length of the ON or OFF signal detected by the position detector, with a predetermined threshold value that is smaller than the value corresponding to the length of the region between the first and second positions, and that is larger than the value corresponding to the length of the ON or OFF signal output in the region other than the region between the first and second positions. Accordingly, with the construction, it becomes easy to drive the zoom lens to the initial position by making use of the detection of the region between the first and second positions.

In the construction, preferably, the position detector outputs one of the ON signal and the OFF signal when the zoom lens is driven between the first position and the region including the second position, and wherein the position detector outputs the other thereof when the zoom lens is driven in a moving region including the third position.

In the construction, alternatively, the position detector may output one of the ON signal and the OFF signal when the zoom lens is driven between the first position and the region including the second position, and wherein the position detector may output the one thereof when the zoom lens is driven in a moving region including the third position.

In the construction, preferably, the controller controls the driving device so as to drive the zoom lens at a relatively low speed for resetting the zoom lens to the initial position thereof, when the position detector outputs the one thereof in correspondence with a state in which the zoom lens is driven in one of a moving region between the first position and the second position, and the moving region including the third position, and wherein the controller controls the driving device so as to drive the zoom lens at a relatively high speed for resetting the zoom lens to the initial position thereof, when the position detector outputs the signal in correspondence with a state in which the zoom lens is driven in a moving region between the second position and the moving region including the third position.

According to still another aspect of the present invention, there is provided an apparatus comprising: a driving mechanism for driving a zoom lens; a position detector for outputting a signal with a first state and a signal with a second state alternately in correspondence with a position of the zoom lens; a controller for controlling the driving mechanism in response to the signal with the first state and the signal with the second state that are output from the position detector, wherein the controller controls the driving mechanism to reset the zoom lens to an initial position of the zoom lens, so that the zoom lens is driven in a first direction in which the zoom lens is moved when the signal with the first state is output from the position detector, and so that the zoom lens is driven in a second direction in which the zoom lens is moved when the signal with the second state is output therefrom.

In the construction, it is preferable that the first direction is a direction in which there arises a change between the signal with the first state and the signal with the second state before the zoom lens reaches one of end parts of a moving field within which the zoom lens is driven to move, and wherein the second direction is a direction in which there arises a change therebetween before the zoom lens reaches the other of end parts thereof.

According to the construction, because there never fails to be a change between the signal with the first state and the signal with the second state before the zoom lens reaches either of end parts of the moving field within which the zoom lens is driven to move, it is possible to prevent the zoom lens from reaching each of end parts thereof at time of initial driving of the zoom lens; namely, it is possible to prevent a mechanical load from exerting upon the zoom lens at time thereof.

Also, according to the construction, it is possible to determine, for example, any possibility about whether or not the zoom lens approaches each of end parts thereof, based upon a change of the signals detected. Therefore, for example, in such a case, it is possible to prevent a strong hitting or striking of the zoom lens by slowing down the speed of the zoom lens when the zoom lens approaches the end part thereof.

In the construction, preferably, the position detector outputs one of the signal with the first state and the signal with the second state when the zoom lens is driven on one of end parts of a moving field within which the zoom lens is driven to move, wherein the position detector outputs the other of the signal with the first state and the signal with the second state when the zoom lens is driven on the other of end parts thereof.

Alternatively, the position detector may output one of the signal with the first state and the signal with the second state when the zoom lens is driven on one of end parts of a moving field within which the zoom lens is driven to move, and wherein the position detector may output the one thereof when the zoom lens is driven on the other of end parts thereof.

In the construction, preferably, the controller controls the driving mechanism so as to drive the zoom lens at a relatively low speed for resetting the zoom lens to the initial position thereof, when the position detector outputs the one of the signal with the first state and the signal with the second state in correspondence with a state in which the zoom lens is positioned on either of the end parts of the moving field, and wherein the controller controls the driving mechanism so as to drive the zoom lens at a relatively high speed for resetting the zoom lens to the initial position thereof, when the position detector outputs the signal that indicates a state in which the zoom lens is positioned between the end parts of the moving field.

BRIEF DESCRIPTION OF THE DRAWINGS

This and other objects and features of the present invention will become clear from the following description taken in conjunction with a preferred embodiment of the present invention and a modification to the embodiment with reference to the accompanying drawings, in which.

DETAILED DESCRIPTION OF THE PREFERRED EMBODIMENT

Figure 1:
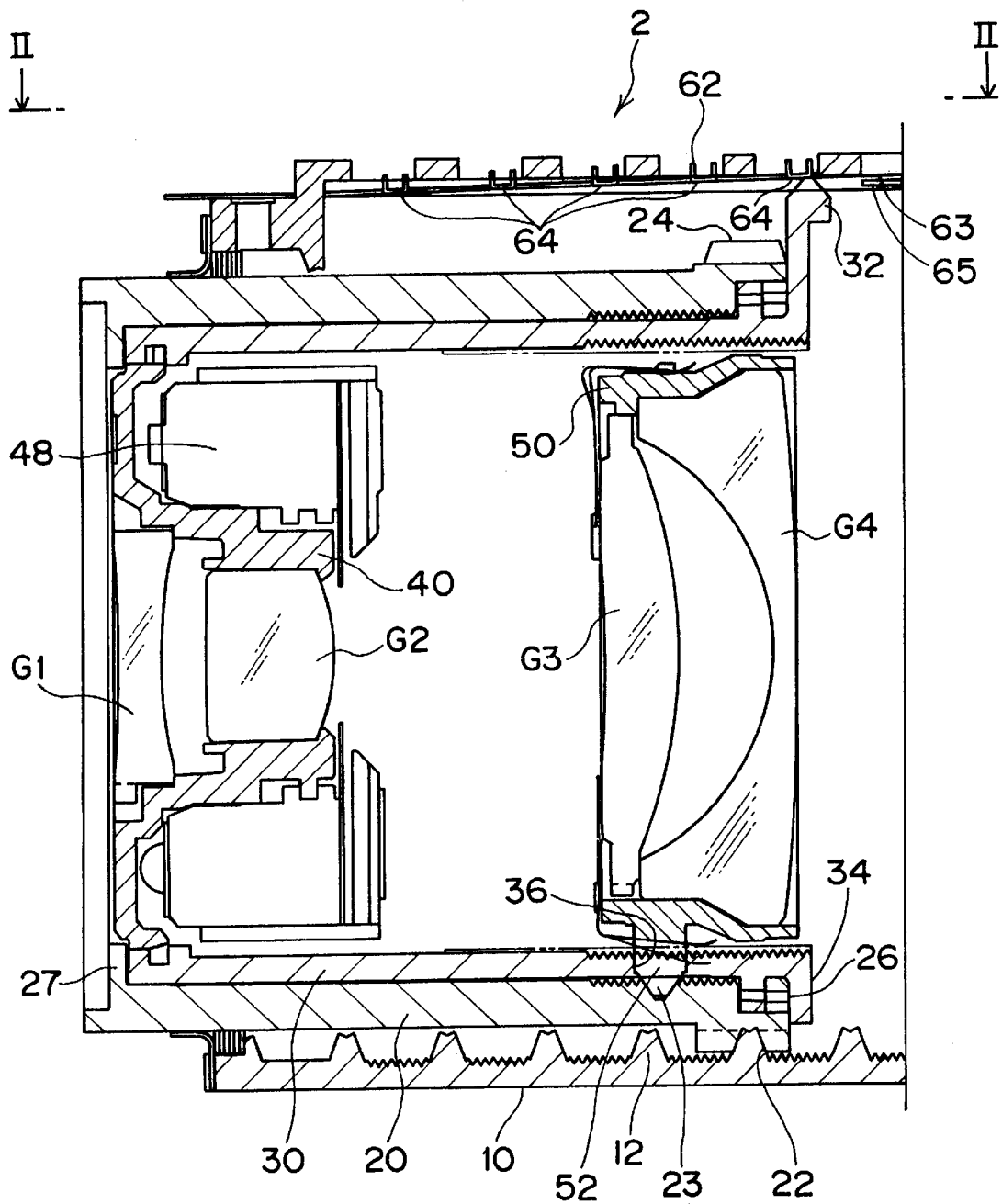
FIG. 1 is a sectional view showing a zoom lens that is installed inside a camera according to a preferred embodiment of the present invention.

Before the description of the preferred embodiment of the present invention and a modification thereto proceed, it is to be noted that like or corresponding parts are designated by like reference numerals throughout the accompanying drawings.

With reference to FIGS. 1 through 5, 7, 8, 11 and 12, a description is made below upon a camera with a zoom lens a position of which is detected by a detector for detecting the position thereof, according to a preferred embodiment of the present invention, and with reference to FIGS. 6, 9 and 10, a description is made below upon a camera with a zoom lens a position of which is detected by a detector for detecting the position thereof, according to a modification to the preferred embodiment thereof.

First, it is explained about the zoom lens which is used in the camera in detail.

The zoom lens 2 of the camera comprises: a stationary barrel 10; a rotary cam cylinder 20 that is rotatably mounted inside the stationary barrel 10; a linearly moving cylinder 30 that is mounted inside the rotary cam cylinder 20; a first lens frame 40 that is mounted inside the linearly moving cylinder 30; a second lens frame 50 that is mounted inside the linearly moving cylinder 30; a shutter unit 48; a first pair of lenses G1, G2 as a first lens unit that are supported by the first lens frame 40; and a second pair of lenses G3, G4 as a second lens unit that are supported by the second lens frame 50.

Figure 11:
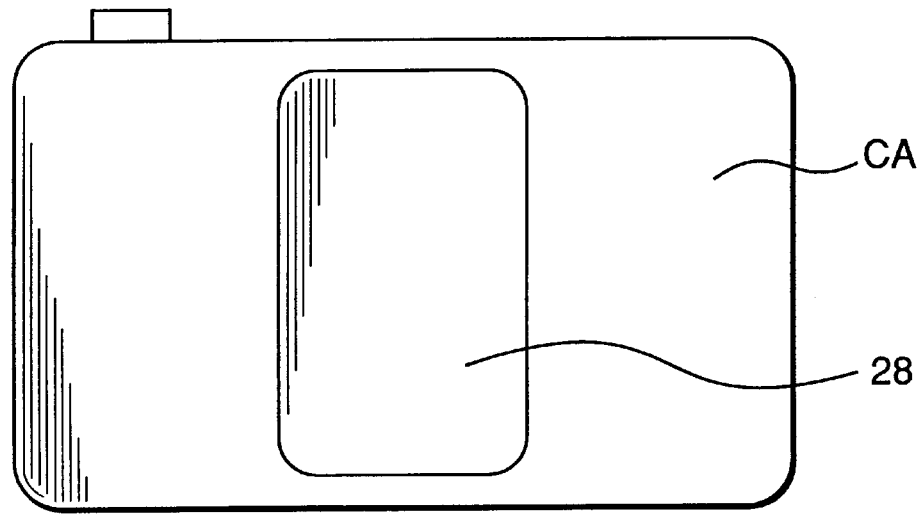
FIG. 11 is a front view showing the camera employing the zoom lens of FIG. 1, in which the lens barrier is closed.
Figure 12:
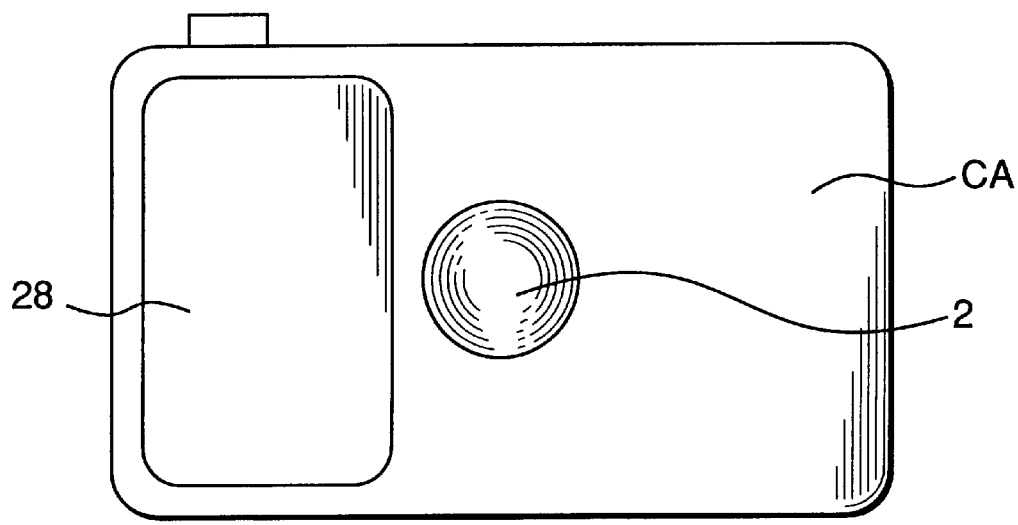
FIG. 12 is a front view of the camera, similar to FIG. 11, in which the lens barrier is opened.

As shown in FIGS. 11 and 12, the zoom lens 2 is employed for the camera having a lens barrier 28. When the lens barrier 28 is opened as shown in FIG. 12, the zoom lens 2 is fed forward (i.e. projected) from a camera body CA.

The stationary barrel 10 is accommodated in the camera body CA. An inner helicoid 12 and a linear guide groove (not shown) extending axially, are formed on an inner peripheral surface of the stationary barrel 10. A portion of an upper part of the stationary barrel 10 is cut away in an axial direction of the zoom lens 2, and a position detecting switch 60 for detecting a position of the lenses forming the zoom lens is installed inside the cutout portion thereon.

The position detecting switch 60 has a first contact piece 62 and a second contact piece 64 both of which are provided axially along the stationary barrel 10. As well shown in FIG. 2, the first contact piece 62 is formed approximately ladder-shaped, and it has a plurality of through-holes 67 and a plurality of transverse portions 66 that are arranged axially such that the transverse portions 66 and the through-holes 67 alternate with each other. Under the transverse portions 66 and the through-holes 67 of the first contact piece 62, a switch projection 32 of the linearly moving cylinder 30, which will be described later, moves axially in accompaniment with an operation of the zoom lens 2.

In the arrangement, when the switch projection 32 of the linearly moving cylinder 30 contacts the transverse portions 66, the first contact piece 62 is raised upwardly and a rear end 63 of the first contact piece 62 moves upwardly away from a rear end 65 of the second contact piece 64. As a result, the first contact piece 62 and the second contact piece 64 are electrically cut off from each other.

On the other hand, when the switch projection 32 is positioned inside the through-hole 67 of the first contact piece 62, the first contact piece 62 returns downwardly to its original position. As a result, the first contact piece 62 is electrically connected to the second contact piece 64.

Figure 3:
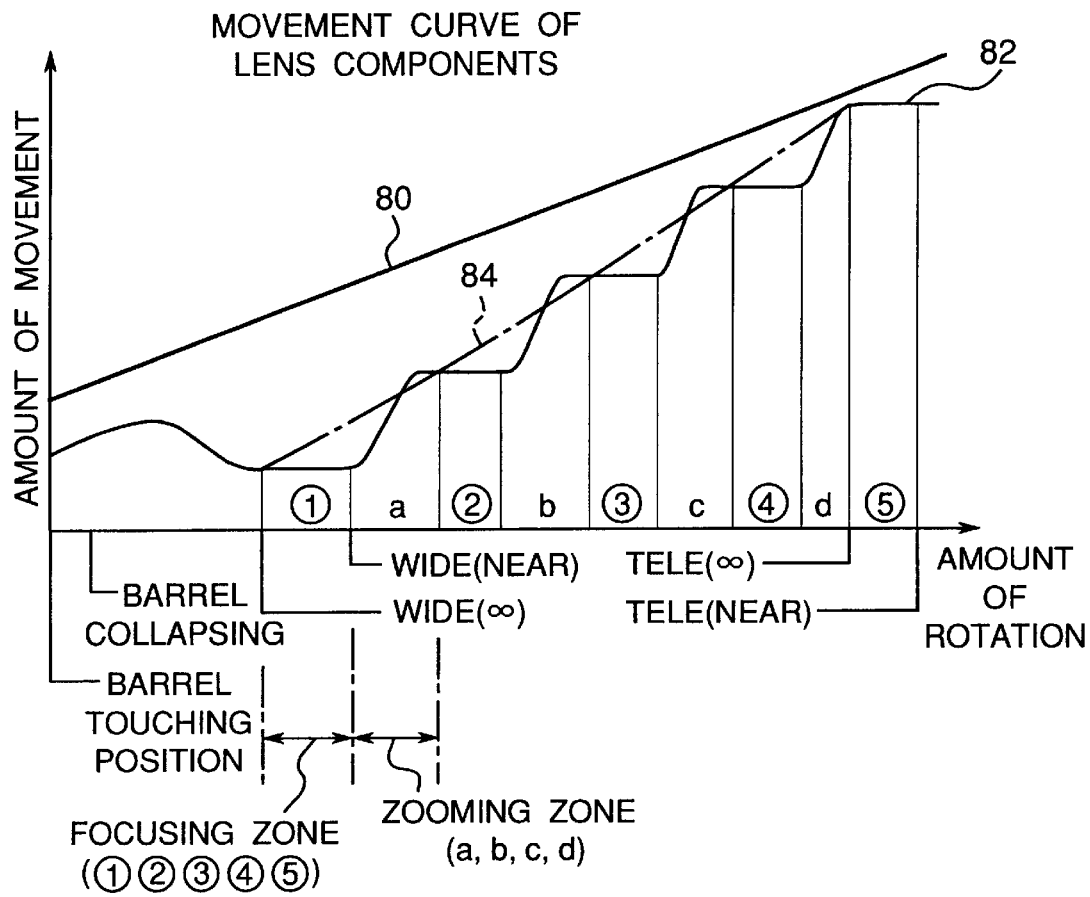
FIG. 3 is a graph showing movements of a plurality of lens units forming the zoom lens of FIG. 1.
Figure 4:
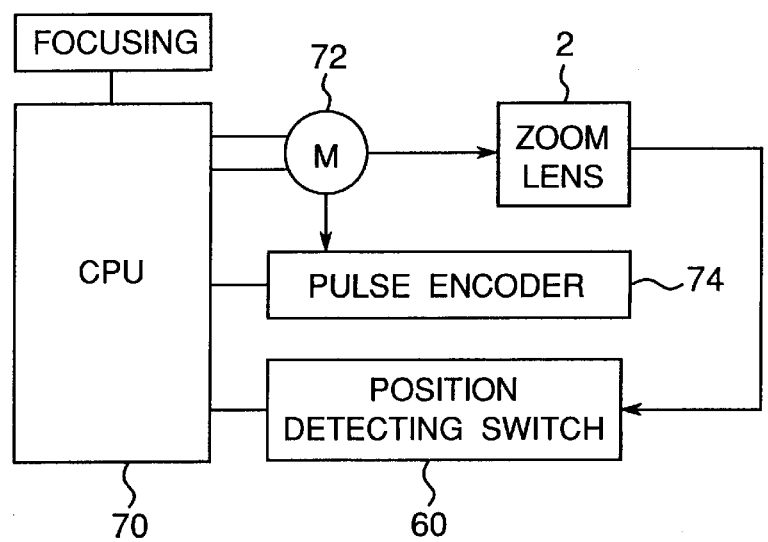
FIG. 4 is an explanatory block diagram of a detector for detecting a position of lens unit employed in the zoom lens of FIG. 1.

The plurality of transverse portions 66, and the plurality of through-holes 67, are formed in correspondence to a plurality of zooming regions (a) through (d) of the zoom lens 2 and to a plurality of focusing regions (1) through (5) thereof, respectively, as shown in FIG. 3. Its position, the size (or width), and the number, of each of the transverse portions 66 and the through-holes 67, are predetermined in accordance with the arrangement of each of the regions (a) through (d) and (1) through (5), and also in accordance with a state of how a plurality of signals are output.

The rotary cam cylinder 20 has a driven gear portion 24 that is formed on a rear circumferential part thereof and that engages an unshown long gear provided on a side of the camera body CA. The driven gear portion 24 has an outer helicoid 22 that engages the inner helicoid 12 formed on the stationary barrel 10.

A middle, inner surface portion of the rotary cam cylinder 20 has a cam groove 23 for the second lens frame 50. A rear end inner surface portion of the rotary cam cylinder 20 is formed as a bayonet claw 26. A front end inner surface portion of the rotary cylinder 20 is formed as an inner flange 27 that projects radially inwardly. The lens barrier 28, as shown in FIGS. 11 and 12, is mounted on the inner flange 27 at the front end surface thereof.

The linearly moving cylinder 30 has a cam hole 36 that penetrates through the linearly moving cylinder 30. The linearly moving cylinder 30 has a flange projecting radially outwardly at a rear end of the linearly moving cylinder 30 in which the flange is connected with the bayonet claw 26 of the rotary cam cylinder 20.

With the arrangement, the linearly moving cylinder 30 moves together with the rotary cam cylinder 20 axially, without a relative axial movement between the linearly moving cylinder 30 and the rotary cam cylinder 20.

Figure 2:
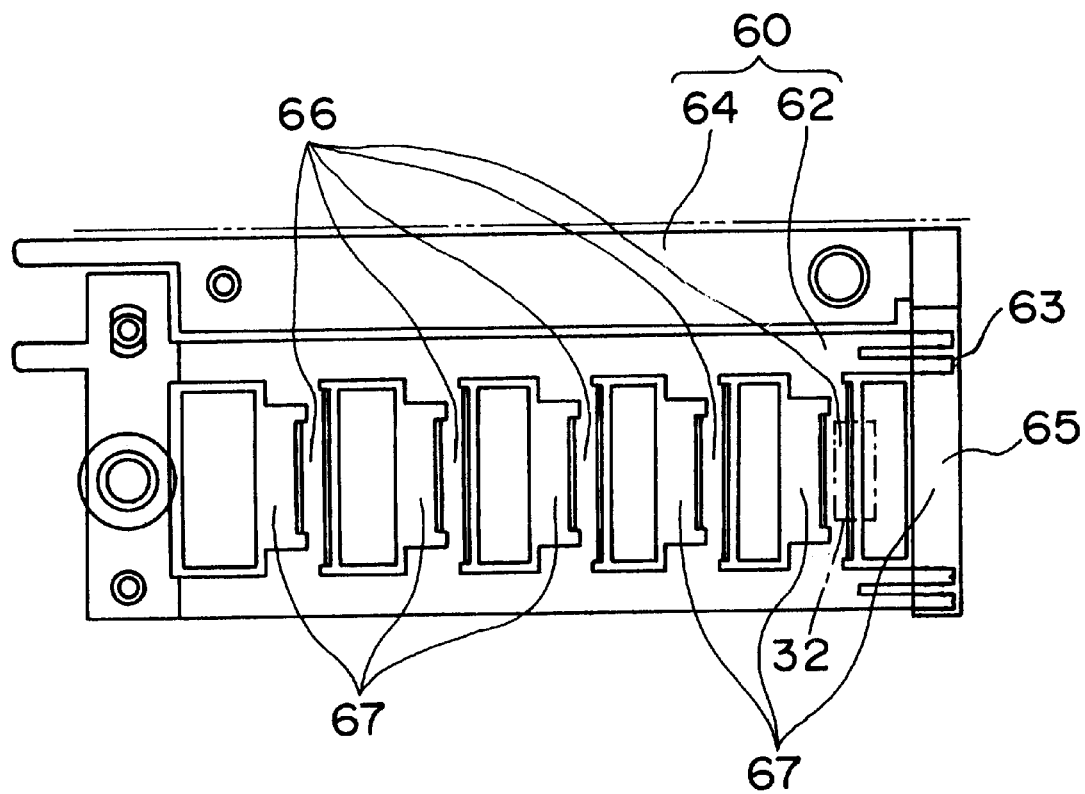
FIG. 2 is a top plan view showing a main portion of the zoom lens of FIG. 1.

At the rear end portion of the linearly moving cylinder 30, it has an unshown linear guide projection that projects radially ourwardly and that engages the unshown linear guide groove formed on the stationary barrel 10, and it has the switch projection 32 that projects radially outwardly and that contacts the first contact piece 62 of the position detecting switch 60 as shown in FIGS. 1 and 2.

The linearly moving cylinder 30 has a groove, for a bayonet connection, that is formed at a front end inner side of the linearly moving cylinder 30. The first lens frame 40 has a flange, for the bayonet connection, that is formed at a front end peripheral portion thereof. The flange of the first lens frame 40 is fixed to the groove of the linearly moving cylinder 30. An inside part of a body of the first lens frame 40 supports the first pair of lenses G1 and G2. An outside part of the body of the first lens frame 40 supports a shutter unit 48 by a bayonet connection, as shown in FIG. 1.

The second lens frame 50 supports the second pair of lenses G3 and G4 on an inner side of a body of the second lens frame 50. The second lens frame 50 has a cam pin 52 that projects outwardly from a peripheral surface of the body of the second lens frame 50, where the cam pin 52 engages both the cam groove 23 of the rotary cam cylinder 20 and the cam hole 36 of the linearly moving cylinder 30.

The zoom lens 2 thus constructed, is driven by an unshown driving motor that is provided inside the camera body, so that the zoom lens 2 moves forward and rearward (i.e. expands and contracts) relative to the camera body.

That is, when the driving motor is rotated, the rotation thereof is transmitted to the rotary cam cylinder 20 via the unshown long gear. As a result, the rotary cam cylinder 20 moves axially along the inner helicoid 12 of the stationary barrel 10 while the rotary cam cylinder 20 is rotating relatively both to the linearly moving cylinder 30 and to the stationary barrel 10. At this time, the linearly moving cylinder 30 connected with the rotary cam cylinder 20, moves linearly, while the rotation of the linearly moving cylinder 30 is restricted by the aforementioned unshown linear guide groove that is formed on the stationary barrel.

Accompanying the expansion and contraction of the rotary cam cylinder 20 and the linearly moving cylinder 30, relative to the stationary barrel 10, both the first lens unit G1, G2 and the second lens unit G3, G4 move in the optical direction.

That is, the first lens frame 40 holding the first pair of lenses G1, G2 moves together with the linearly moving cylinder 30. The second lens frame 50 holding the second pair of lenses G3, G4 moves axially relatively to the rotary cam cylinder 20 and the linearly moving cylinder 30, due to the rotation of the rotary cam cylinder 20 relative to the linearly moving cylinder 30.

In the movement thereof, as shown by a reference numeral 80 in FIG. 3, the first lens unit G1 and G2 moves axially, linearly relative to the rotation of the driving motor; in other words, the amount of axial movement of the first lens unit G1 and G2 is proportional to the amount of rotation of the rotary cam cylinder 20.

It is to be noted that a second lens unit in a conventional type of two-component zoom lens moves approximately linearly (i.e. generally proportionally) relative to a rotation thereof, as shown by a reference numeral 84 of FIG. 3.

In contrast with the conventional zoom lens, as shown by a reference numeral 82 in the same figure, the second lens unit G3 and G4 of the zoom lens 2 of this embodiment moves axially stepwise relative to the rotation of the driving motor; in other words, the amount of axial movement of the second lens unit G3 and G4 is not proportional to the amount of rotation of the rotary cam cylinder 20.

With the arrangement and movement thereof of the embodiment, in the zooming region (a), (b), (c) and (d) in which the first lens unit G1, G2 and the second lens unit G3, G4 move approximately linearly (i.e. proportionally) relative to the rotation of the rotary cam cylinder 20, the focal length of the zoom lens 2 changes continuously, accompanying the rotation of the rotary cam cylinder 20.

On the other hand, in the focusing region (1), (2), (3) and (4) in which only the first lens unit G1 and G2 moves linearly and the second lens unit G3 and G4 does not move linearly, merely the focusing of the zoom lens 2 is adjusted.

According to the embodiment, the focusing regions (1) through (4), and the zooming region (a) through (d), are arranged alternately with each other. Therefore, it is possible to omit a provision of a mechanism for adjusting the focus of the zoom lens, which allows the zoom lens 2 to have a simpler construction. By the way, hereinafter, a position at which an object to be photographed with the object being located at an infinite position is focused is referred to as a "∞ position," and a position at which an object to be photographed with the object being located at a nearest position is focused is referred to as a "nearest position," respectively.

Meanwhile, a position of the zoom lens 2, namely a state in which the zoom lens 2 is expanded or contracted, is detected by a detector for detecting a position or state of the zoom lens 2. That is, as shown by a block diagram of FIG. 4, the detector has a position detecting switch 60 for detecting a reference position (or a standard position) of the zoom lens 2 in correspondence with each of the focusing regions (1) through (5), a driving motor 72 for driving the zoom lens 2, a pulse encoder 74 for detecting a rotation amount of the driving motor 72, an operation control device or CPU 70, and a focusing device for measuring and determining a distance between the object to be photographed and the zoom lens 2 in order to decide a focusing position of the zoom lens 2.

The position detecting switch 60 is located at a position at which the lens is a little bit retracted or contracted from the "∞" position of each focusing regions toward the wide angle side where the position detecting switch detects the reference position thereof. The zoom lens 2 is controlled to be stopped at a position at which the lens is a little bit retracted or contracted from the "reference position" toward the wide angle side, when a power supply switch of the camera is turned "ON" or when a zooming operation is performed. The stopped position of the lens is referred to as a "stand-by position."

With the arrangement, when a shutter release operation is performed, first, the lens is moved forward from the "stand-by position", and then the lens arrives at the "reference position" at which the position detecting switch 60 detects the arrival of the zoom lens 2. The zoom lens 2 is then moved to a desired focusing position relative to the "reference position", based on an output from the pulse encoder 74, and then an exposure operation is performed.

After the exposure operation is completed, the zoom lens 2 is driven rearward or backward (namely, toward the camera body side). When the position detecting switch 60 detects that the lens reaches the reference position and then it is detected that the lens 2 has arrived at the stand-by position due to the output from the pulse encoder 74, the driving of the zoom lens 2 is stopped and a series of shutter release operations terminates.

That is, when the power supply switch of the camera body is turned "ON", the detector for the position of the zoom lens 2 executes a resetting operation to drive the zoom lens 2 to a predetermined position. Then, the zoom lens 2 is driven appropriately according to a switch operation.

Figure 5:
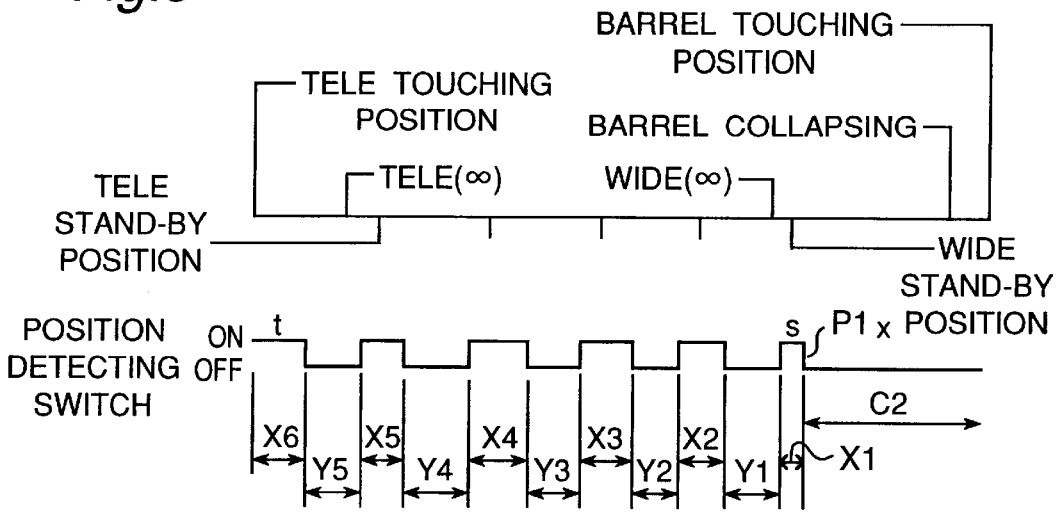
FIG. 5 is an explanatory view of the detector therefor, in case that the detector is "ON" on one of ends of region within which the zoom lens is driven to move and in case that the detector is "OFF" on the other thereof.
Figure 6:
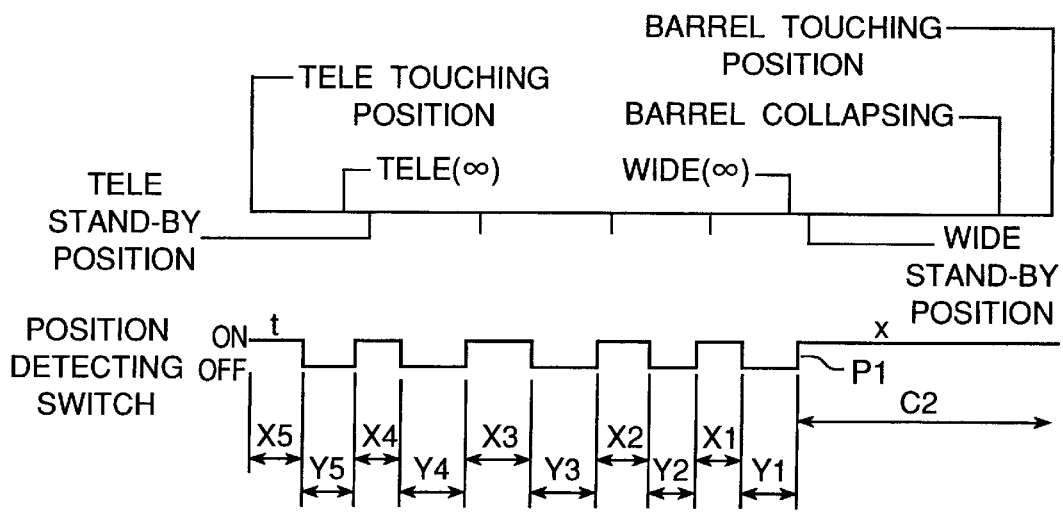
FIG. 6 is an explanatory view of the detector for detecting a position of lenses in a zoom lens that is employed in a camera according to a modification to the preferred embodiment, in case that the detector is "ON" on one of ends of region within which the zoom lens is driven to move and in case that the detector is also "ON" on the other thereof.

Regarding the resetting operation of the zoom lens 2, it is explained below upon a signal mode in which the position detecting switch 60, of the camera according to the embodiment of the present invention, is turned "ON" at one end of driving range of the zoom lens 2 and is turned "OFF" at the other end thereof as shown in FIG. 5, and it is explained below upon a signal mode in which the position detecting switch 60, of the camera according to the modification to the embodiments, is turned "ON" at both ends of the driving range thereof as shown in FIG. 6.

First, with reference to FIGS. 5, 7 and 8, it will be described below upon the zoom lens-resetting operation in case that the position detecting switch 60 is turned "ON" at one end of driving range of the zoom lens 2 and is turned "OFF" at the other end thereof.

As shown in FIG. 5, the position detecting switch 60 is "OFF" in case that the zoom lens 2 is located within a region "x" between a barrel collapse end position of the zoom lens 2 and a position a little bit before a "wide stand-by position". The position detecting switch 60 is "ON" in case that the zoom lens 2 is located within a region "S" between the position a little bit before the "wide stand-by position", and a "wide end position" namely a position a little bit before the "wide ∞". The boundary position, between the regions of "X" and "S," at which it is switched between the "ON" and "OFF", is shown as "P1" in FIG. 5.

On the other hand, the position detecting switch 60 is "ON" in case that the zoom lens 2 is located within a region "t" between a position (i.e. a tele touching position) at which the zoom lens 2 remains projecting or forwarding toward a telephoto side at its maximum and a position at which the zoom lens 2 is a little bit toward the wide angle side therefrom.

The number of pulses, which the pulse encoder 74 reads, in each region in which the position detecting switch 60 is "ON" or "OFF," is denoted as "C2," "X1" through "X6," and "Y1" through "Y5," as shown in FIG. 5. It is assumed that "C1"="C2"+"α1", "C3"=MAX(X1 to X6)+"α3", and "C4"=MAX(Y1 to Y5)+"α4". In these equations, "α1", "α3", and "α4" are allowance numbers of pulses which are determined in consideration of a variation, etc. of the detected number of pulses. MAX (X1 to X6) is the maximum value of "X1" to "X6". MAX (Y1 to Y5) is the maximum value of "Y1" to "Y5". In the relation, the value (i.e. the interval or region) of "C2 is set to be much greater than "C3" and "C4". Namely, the following relation is established:

C2>>C3 and C2>>C4.

Figure 7:
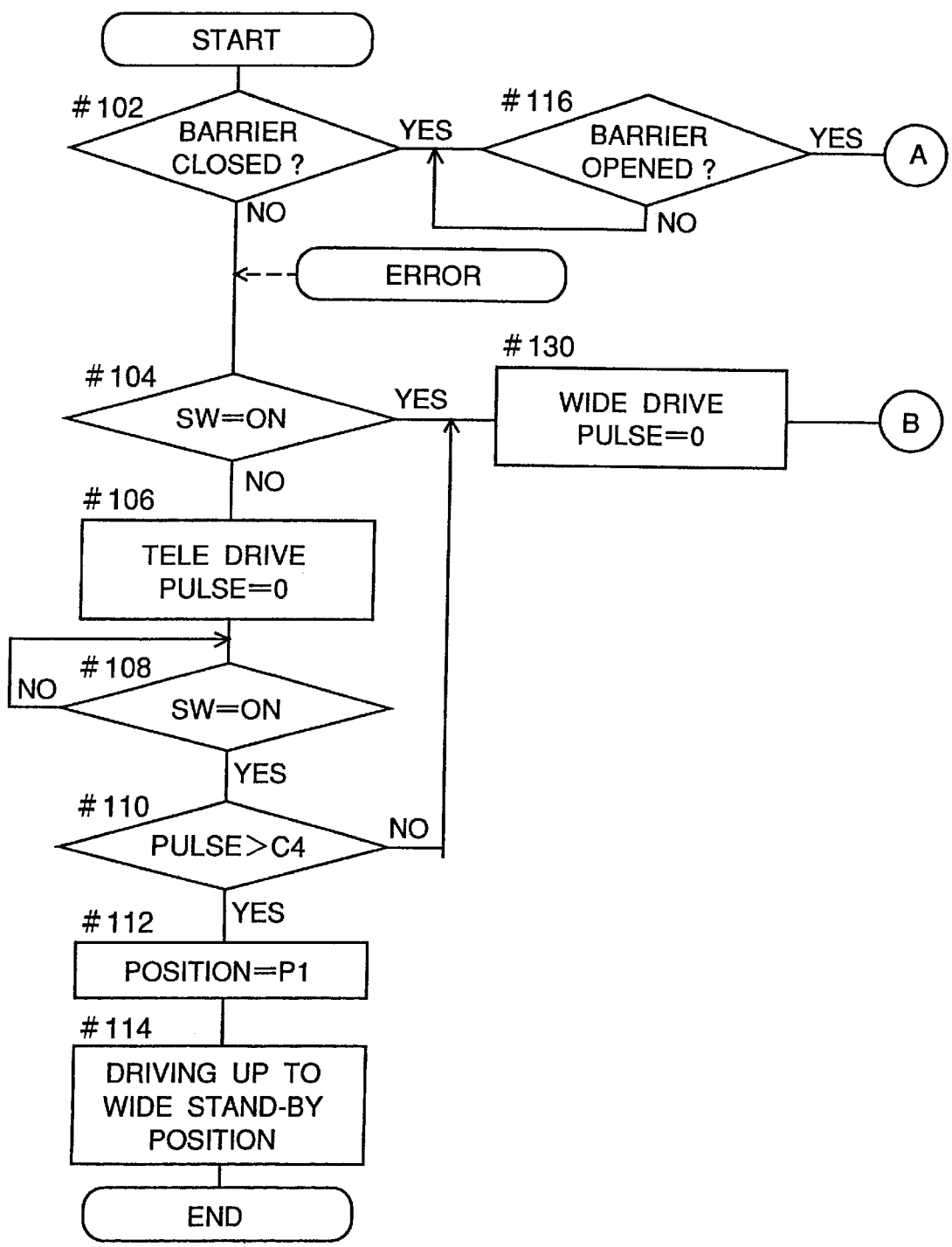
FIG. 7 is a flowchart showing an operation of the camera that is provided with the detector having the function of FIG. 5.
Figure 8:
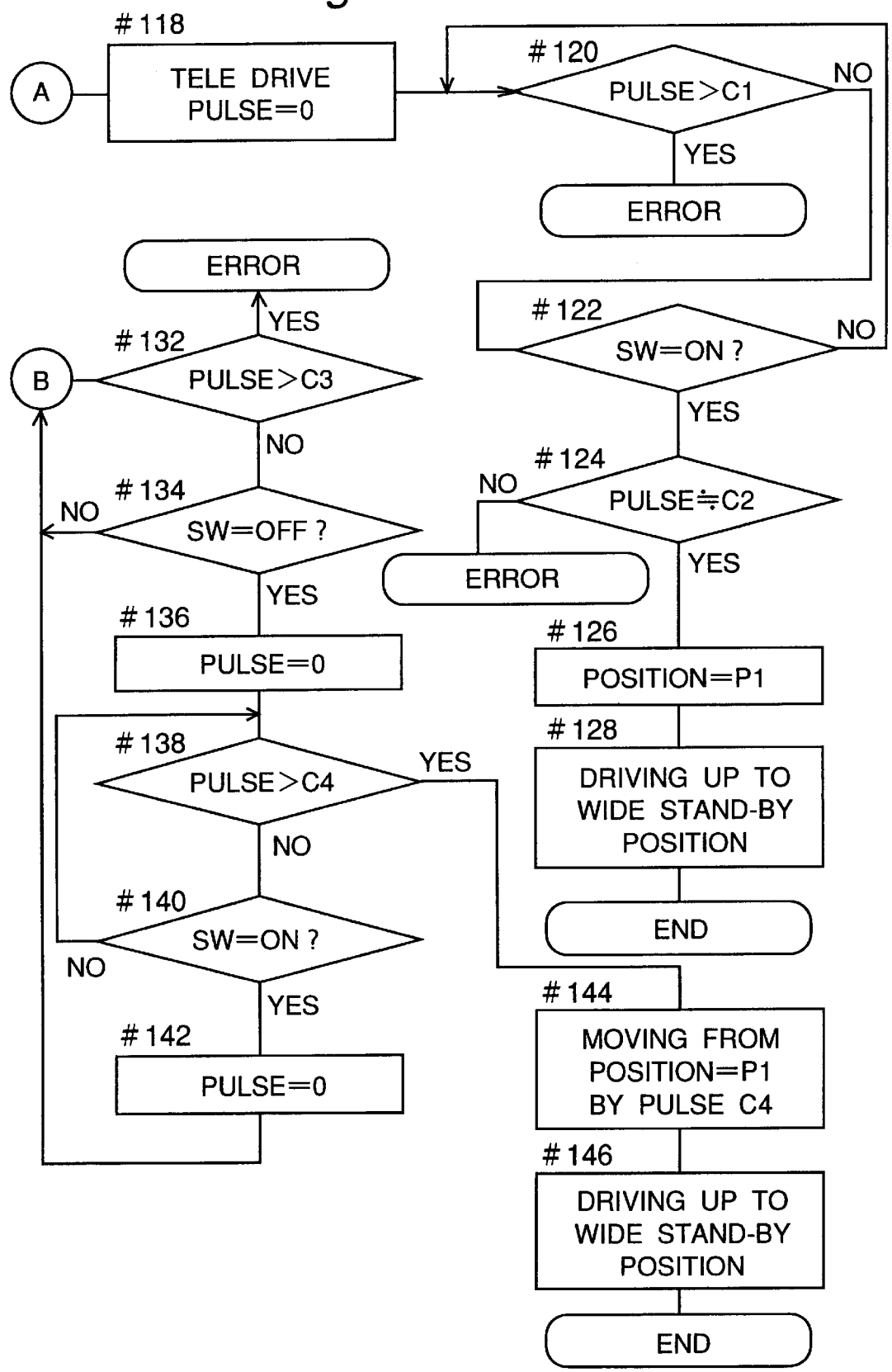
FIG. 8 is a flowchart following the flowchart of FIG. 7.

The zoom lens 2 executes the resetting operation in accordance with the flowcharts of FIGS. 7 and 8, using the numbers of pulses "C2", "C3", and "C4" explained above.

That is, as shown in FIG. 7, when the resetting operation is started, it is determined at step #102 whether the lens barrier 28 is opened or closed manually. If it is determined that the lens barrier 28 is opened, it is determined at step #104 whether or not the position detecting switch 60 is "ON". If it is determined that the position detecting switch 60 is not "ON"; namely, if the position detecting switch 60 is "OFF", a pulse counter is cleared into zero (i.e. set to zero) at step #106 and the driving motor 72 is started to drive the zoom lens 2 toward the telephoto side. Then, at step #108, the pulse counter keeps counting the number of pulses until the position detecting switch 60 is "ON". Next, if it is determined that the position detecting switch is "ON", it is determined at step #110 whether or not the value of the pulse counter is greater than "C4".

On the other hand, if it is determined at step #104 that the position detecting switch 60 is "ON", the program proceeds to step #130 where a pulse counter is cleared into zero (i.e. set to zero) and the driving motor 72 is started to drive the zoom lens 2 toward the wide angle side.

If it is determined at step #110 that the value of the pulse counter is greater than "C4", the length of the "OFF interval" or "OFF region" in which the position detecting switch 60 is "OFF" is greater than any of "Y1" to "Y5". Thus, it is determined at step #112 that the zoom lens 2 is located at the position "P1". Then, at step #114, the zoom lens 2 is moved toward the wide angle side and it is stopped at the "wide stand-by position" that is a little bit before the "wide ∞" position.

On the other hand, if it is determined at step #110 that the number of pulses is not greater than C4", it is found that the zoom lens 2 has been initially driven from either of the focussing regions "Y1" to "Y5" or that the zoom lens 2 has been initially driven from a location on a telephoto side of the region "X", and it is found that the zoom lens 2 is now positioned at either of regions "X1" to "X6". Therefore, the pulse counter is cleared to zero at step #130, and then the zoom lens 2 is driven to move toward the wide angle side. Then, the number of pulses is continuously counted up while determining at steps #132 and #134 whether the value of the pulse counter is greater than "C3" or not, until the position detecting switch 60 is "OFF".

In the pulse counting operation, if it is determined at step #132 that the value of the pulse counter becomes greater than "C3", a predetermined error disposal (or error processing) is executed. On the other hand, if it is determined at step #134 that the position detecting switch 60 is "OFF", the pulse counter is cleared to zero at step #136. Then, it is determined at step #138 whether the value of the pulse counter is greater than "C4" or not. Then, at step #140, the number of pulses is counted up until the position detecting switch 60 is turned "ON". That is, the length of the "OFF interval" during which the position detecting switch 60 is "OFF" is determined or calculated.

Meanwhile, if it is determined at step #138 that the value of the pulse counter is greater than "C4", it is determined at step #144 that the zoom lens 2 has been moved from the position "P1" toward a position that is on a barrel collapse touching position by an amount or length corresponding to "C4" pulses. Thus, at step #146, the zoom lens 2 is moved toward the telephoto side and it is stopped at the "wide stand-by position".

On the other hand, if it is determined at step #138 that the value of the pulse counter is not greater than "C4" and if it is determined at step #140 that the position detecting switch 60 is "ON", the pulse counter is cleared to zero at step #142. Then, the program returns to the step #132, and the above procedure is repeated again.

By the way, if it is detected at step #104 in FIG. 7 that the position detecting switch 60 is "ON", the zoom lens 2 is in either of the regions "X1" to "X6". Therefore, the program proceeds to step #130, just like the routine carried out in case that it is determined at step #110 that the number of pulses is not greater than "C4".

Meanwhile, if it is determined at step #102 that the lens barrier 28 is closed, the program proceeds to step #116 where it is determined whether the lens barrier 28 is opened or not, and a complete opening of the lens barrier 28 is waited. In case that it is determined at step #116 that the lens barrier 28 is opened, the pulse counter is cleared to zero and the zoom lens 2 is driven to move toward the telephoto side at step #118. Then, it is determined at step #120 whether the value of the pulse counter is greater than "C1" or not. If it is determined at step #120 that the number of pules is greater than "C1", the program is processed as an error. On the other hand, if it is determined at step #120 that the number thereof is not greater than "C1", the program proceeds to step #122 where it is determined whether the position detecting switch 60 is "ON" or "NOT". Namely, through steps #120 and #122, the pulse counter counts up the number of pulses until the position detecting switch 60 is turned "ON".

If it is detected that the position detecting switch 60 is turned "ON" at step #122, it is determined at step #124 whether the value of the pulse counter is approximately equal to "C2". If it is determined at step #124 that the value thereof is not approximately equal to "C2", a predetermined disposal or process as an error is executed. On the other hand, if it is determined at step #124 that the value of the pulse counter is approximately equal to "C2", it turns out that the zoom lens 2 which has positioned at the barrel collapse touching position moves to the reference position "P1". Therefore, at step #128, the zoom lens 2 is driven to move further toward the telephoto side by a predetermined number of pulses, and then the zoom lens 2 is stopped at the "wide stand-by position".

By executing the resetting operation as explained above, a reach of the zoom lens 2 to either of the extremities (namely, the barrel collapse touching position and the tele touching position) between which the zoom lens 2 is driven to move, is effectively prevented. The barrel collapse touching position and the tele touching position are the mechanical limiting positions beyond which the zoom lens 2 cannot be moved, and against which the zoom lens 2 bumps to stop mechanically. Consequently, it is possible to carry out the resetting operation of the zoom lens 2 without employing a special switch to specify the position of the zoom lens 2 and with a lesser exertion of a mechanical load upon the zoom lens.

Next, with reference to FIGS. 6, 9 and 10, the zoom lens resetting operation will be described below in terms of the signal mode in which the position detecting switch 60 is turned "ON" at both ends of the driving range of the zoom lens 2.

As shown in FIG. 6, the position detecting switch 60 is "ON" in case that the zoom lens 2 is located in an interval "x" between the barrel collapse end position and a position a little bit before the "wide ∞" position. The reference numeral "P1" indicates a position at which the "ON" and "OFF" state changes. The number of pulses, which the pulse encoder 74 reads, in each region in which the position detecting switch 60 is "ON" or "OFF," is denoted as "C2," "X1" through "X5," and "Y1" through "Y5," as shown in FIG. 6. It is assumed that "C1"="C2"+"α1", "C3"=MAX (Y1 to Y5)+"α3", and "C4"=MAX (X1 to X5)+"α4". In these equations, "α1", "α3", and "α4" are allowance numbers of pulses which are determined in consideration of a variation, etc. of the detected number of pulses. MAX (X1 to X5) is the maximum value of "X1" to "X5". MAX (Y1 to Y5) is the maximum value of "Y1" to "Y5". In the relation, the value (i.e. the interval or region) of "C2" is set to be much greater than "C3" and "C4". Namely, the following relation is established:

$$C2 \gg C3 \text{ and } C2 \gg C4.$$

Figure 9:
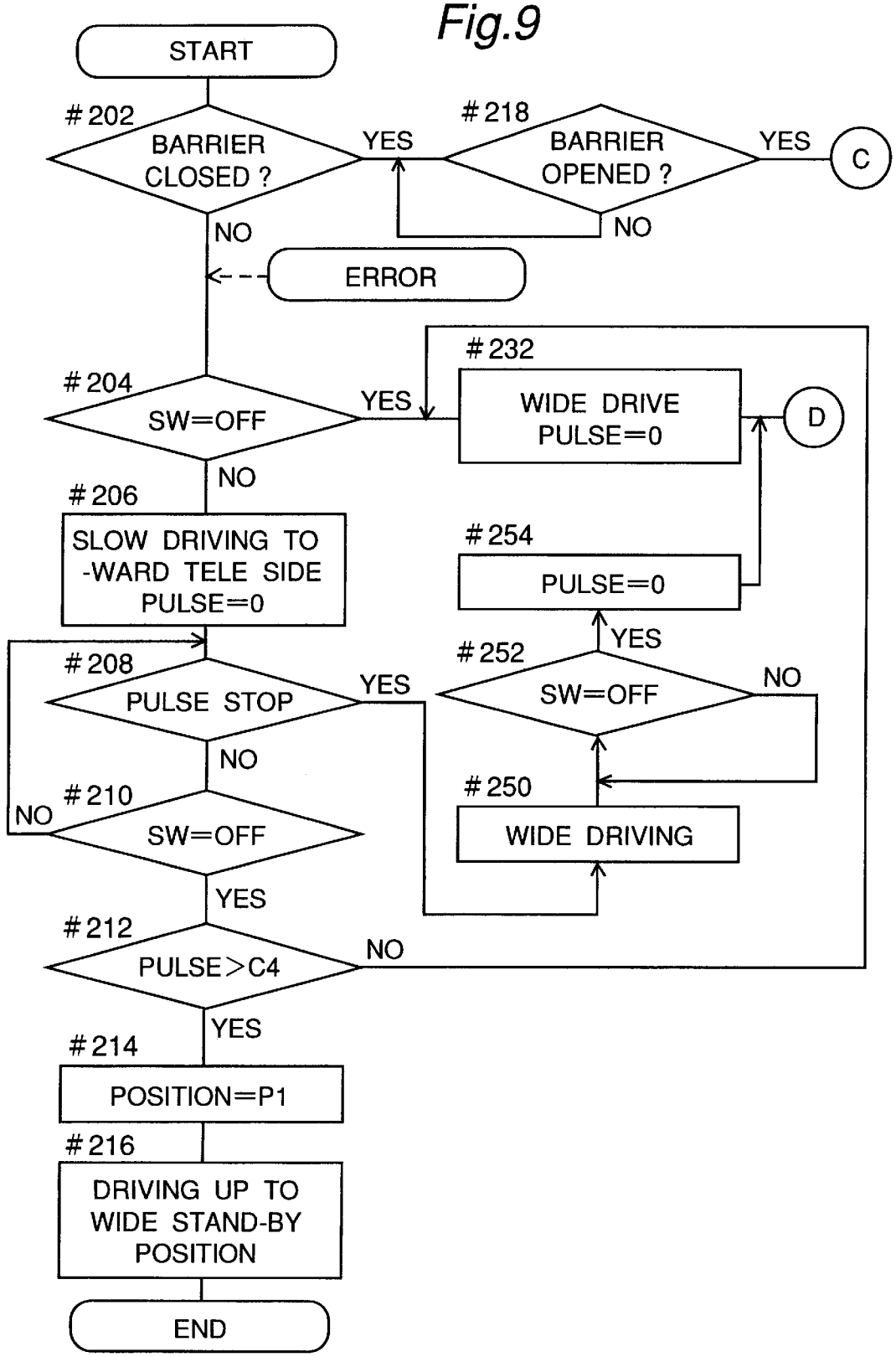
FIG. 9 is a flowchart showing an operation of the camera that is provided with the detector having the function of FIG. 6.
Figure 10:
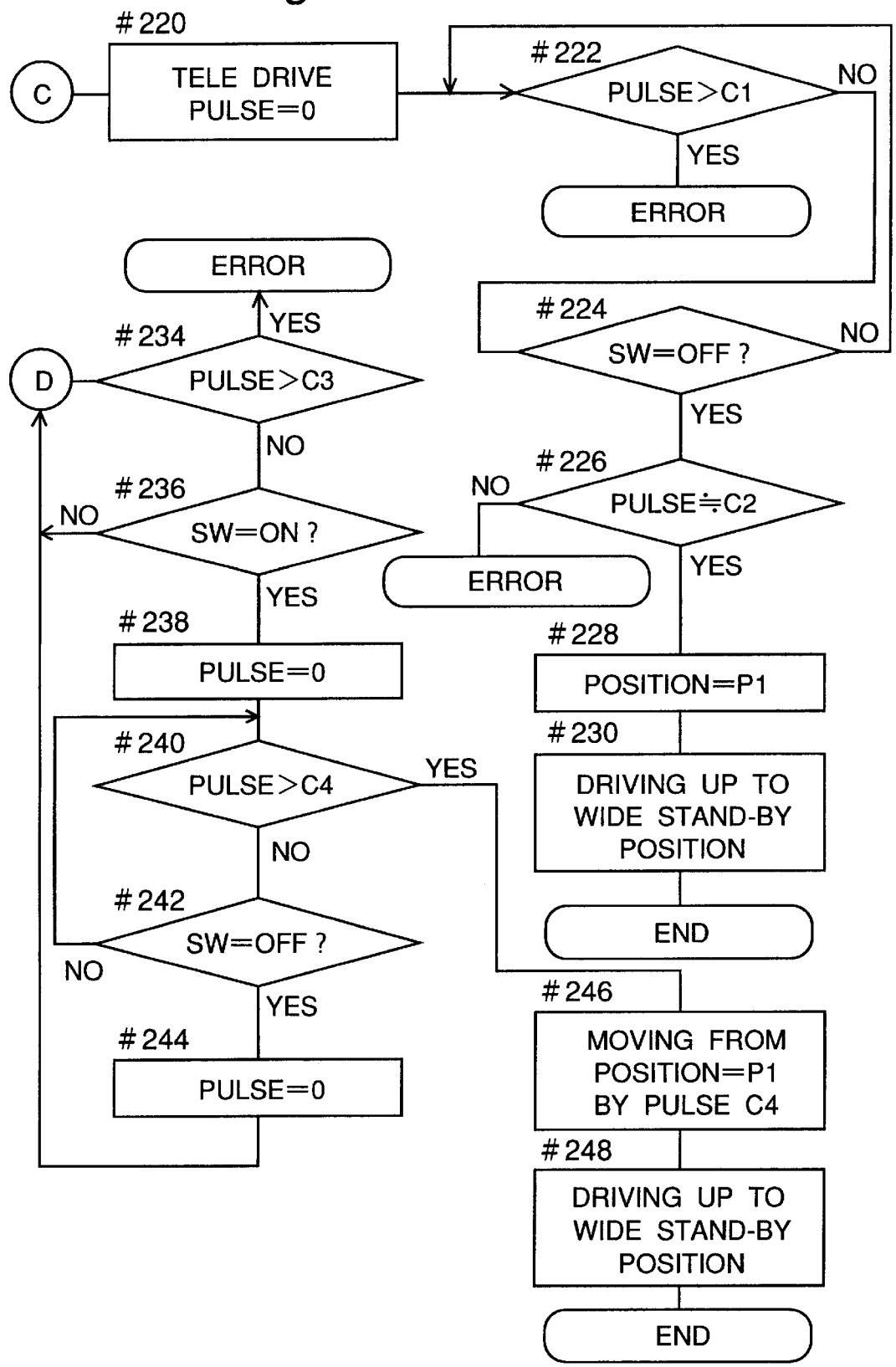
FIG. 10 is a flowchart following the flowchart of FIG. 9.

The zoom lens 2 executes the following lens resetting operation, based upon the "C2", "C3", and "C4", in accordance with the flowcharts of FIGS. 9 and 10.

That is, when the resetting operation is started, it is determined at step #202 whether the lens barrier 28 is opened or closed. If it is determined that the lens barrier 28 is opened at step #202, it is determined at step #204 whether or not the position detecting switch 60 is "OFF". If it is determined that the position detecting switch 60 is not "OFF", the pulse counter is set to zero at step #206 and the zoom lens 2 is moved toward the telephoto side at a low speed. The reason why the zoom lens 2 is moved at the low speed is to prevent the zoom lens 2 from abruptly or strongly striking at the "tele touching position" which is one end of driving region of the zoom lens, in case that the zoom lens 2 is located in the interval "t" between the "tele touching position" and a position a little bit on a "wide side" relative to the "tele touching position".

Through steps #208 and #210, the number of pulses is counted up, until the position detecting switch 60 is turned "OFF" while the CPU monitors whether there is a change in the number of pulses. If it is determined at steps #208 and #210 that there is no change of the number of pulses, there is a possibility that the zoom lens 2 is at the tele touching position. Accordingly, at steps #250 and #252, the zoom lens 2 is driven towards the "wide angle side" until the position detecting switch 60 is turned "OFF". If it is determined at step #252 that the position detecting switch 60 is "OFF", the pulse counter is cleared to zero at step #254. Then, the program goes to step #234 which will be explained later.

The operation which is executed at step #234 will be described later.

If the position detecting switch 60 is "OFF" after a continuous change of the number of pulses through steps #208 and #210, it is determined at step #212 whether the value of the pulse is greater than "C4" or not.

If it is determined at step #212 that the value of the pulse counter is greater than "C4", it is determined at step #214 that the zoom lens 2 is located at the position "P1". Then, at step #216, the zoom lens 2 is moved toward the "wide side" and is stopped at the "wide stand-by position".

If it is determined at step #212 that the value of the pulse counter is not greater than "C4", the pulse counter is cleared to zero at step #232, and the zoom lens 2 is moved toward the "wide angle side". Then, at steps #234 and #236, the pulse counter counts up the number of pulses until the position detecting switch 60 is turned "ON" in order to determine a length of interval within which the position detecting switch 60 remains to be "OFF". If it is determined at step #234 that the value of the pulse counter is greater than "C3" during the count up of the number of pulses, a predetermined error processing is executed.

If it is determined at step #236 that the position detecting switch 60 is "ON", the pulse counter is cleared to zero at step #238. Then, it is determined at step #240 whether the value of the pulse counter is greater than "C4" or not. Then, at step #242, the pulses are counted up by the pulse counter until the position detecting switch 60 is "OFF". That is, a length of interval within which the position detecting switch 60 remains to be "ON".

If it is determined at step #240 that the value of the pulse counter is greater than "C4" during the increment of the number of pulses, it is determined that the zoom lens 2 has moved from the position "P1" towards the barrel collapse touching position by a length or displacement corresponding to "C4" pulses. Thus, at step #246, the zoom lens 2 is moved towards the "telephoto side" and is stopped at the "wide stand-by position".

On the other hand, if it is determined at step #240 that the value of the pulse counter is not greater than "C4" and if it is determined at step #242 that the position detecting switch 60 is "OFF", the pulse counter is cleared to zero at step #244. Then, the program returns back to step #234, and the aforementioned steps are repeated again.

On the other hand, if it is determined at step #202 that the lens barrier 28 is closed, the program proceeds to step #218, where it is determined whether the lens barrier 28 is opened or closed, and where the program waits for a complete opening of the lens barrier 28.

If it is determined at step #218 that the position detecting switch 60 is opened, the pulse counter is cleared to zero and the zoom lens 2 is driven toward the "tele side" at step #220. Then, it is determined at step #222 whether the value of the pulse counter is greater than "C1" or not, and if it is determined at the step #222 that the value thereof is greater than "C1", a predetermined error processing is carried out. Meanwhile, if it is determined at step #222 whether the value of the pulse counter is not greater than "C1", the program proceeds to step #224 where it is determined whether the pulse detection switch 60 is "OFF" or not. Namely, through steps #222 and #224, the pulses thereof keep to be counted up until the position detecting switch 60 is turned "OFF".

If it is determined at step #224 that the position detecting switch is turned "OFF", it is determined at step #226 whether the value of the pulse counter is nearly equal to C2 or not. If it is determined at the step #226 that the value of the pulse counter is not nearly equal to "C2", a predetermined error processing is executed. If it is determined at the same step #226 that the value of the pulse counter is nearly equal to "C2", the program proceeds to step #228 where it is determined that the zoom lens 2, which has located at the barrel collapse touching position, is moved to the reference position "P1". Accordingly, at step #230, the zoom lens 2 is driven to move towards the barrel collapse touching position, and is stopped at the "wide stand-by position".

With the above lens resetting operation of the zoom lens 2, the zoom lens 2 is prevented from reaching the barrel collapse touching position and the tele touching position which are the ends or extremities of range within which the zoom lens 2 is driven to move, or the zoom lens 2 is prevented from striking (or hitting) hard at one of the corresponding touching positions. Accordingly, it is unnecessary to employ a special switch able to specify a position of the zoom lens 2, and it is possible to execute the lens resetting operation with a state in which a lesser mechanical load is exerted upon the zooming mechanism of the zoom lens 2.

Needless to say, as another modification to the embodiment, the signals of "ON" and "OFF" can be reversed, and with the construction, the same function as that of the embodiment can be achieved.

Although the present invention has been fully described in connection with the preferred embodiment thereof and the modifications to the embodiment with reference to the accompanying drawings, it is to be noted that various other changes and modifications are apparent to those skilled in the art. For example, the present invention is applicable to a zoom lens executing a focusing operation which is carried out independently of its zooming operation. Such changes and modifications are also to be understood as included within the scope of the present invention as defined by the appended claims unless they depart therefrom.

What is claimed is:

1. An apparatus comprising:

a driving device that drives a zoom lens;

a position detector that outputs a detection signal that alternates between ON and OFF states a plurality of times as the lens is moved from one extreme position thereof to the other extreme position thereof, in correspondence with a position of the zoom lens; and a controller that controls the driving device in correspondence with the detection signal output from the position detector, wherein the controller controls the driving device to reset the zoom lens to an initial position thereof, so that the driving device drives the zoom lens in a first direction when the position detector outputs the detection signal of ON, and so that the driving device drives the zoom lens in a second direction when the position detector outputs the detection signal of OFF.

2. The apparatus as claimed in claim 1, wherein the position detector outputs the detection signal of ON when the zoom lens is positioned toward one end of a field within which the zoom lens is driven to move, and wherein the position detector outputs the detection signal of OFF when the zoom lens is positioned toward the other end thereof.

3. The apparatus as claimed in claim 1, wherein the position detector outputs the detection signal of one of the states of ON and OFF when the zoom lens is positioned toward one end part of a field within which the zoom lens is driven to move, and wherein the position detector outputs the detection signal of said one state when the zoom lens is positioned toward the other end part thereof.

4. The apparatus as claimed in claim 3, wherein the controller controls the driving device so as to drive the zoom lens at a relatively low speed for resetting the zoom lens to the initial position thereof, when the zoom lens is positioned on the end parts of the field within which the zoom lens is driven to move and when the position detector outputs the detection signal of the one of ON and OFF, and wherein the controller controls the driving device so as to drive the zoom lens at a relatively high speed for resetting the zoom lens to the initial position thereof, when the position detector outputs the detection signal which indicates that the zoom lens is not positioned on the end part of the field.

5. An apparatus comprising:

a driving device that drives a zoom lens;

a position detector that alternately outputs an ON signal and an OFF signal a plurality of times over the range of movement of the zoom lens, in correspondence with a position of the zoom lens, wherein the position detector outputs the ON signal at one end part of a moving field within which the zoom lens is moved, and wherein the position detector outputs the OFF signal at the other end part thereof; and a controller that controls the driving device so as to execute an operation for resetting the zoom lens to an initial stand-by position thereof, in response to the ON signal and the OFF signal which are output from the position detector.

6. An apparatus comprising:

a zoom lens that is driven along:

a first position, in a direction in which the zoom lens is driven, at which the zoom lens is retracted inside a body of the apparatus and at which the zoom lens is in an unusable state, a second position, in the direction at which the zoom lens is forwarded outside from the first position, wherein the second position corresponds to one extremity in a usable state of a region within which the zoom lens is movable, and a third position, in the direction at which the zoom lens is further forwarded outside from the second position, wherein the third position corresponds to the other extremity in the usable state thereof, wherein the zoom lens can take an arbitrary position between the first position, the second position and the third position;

a driving device for driving the zoom-lens in said direction;

a position detector for outputting an ON signal and an OFF signal alternately when the zoom lens is driven between the second position and the third position by the driving device; and a controller for controlling the driving device in response to the ON signal and the OFF signal that are output from the position detector, so as to reset the zoom lens to an initial position thereof, wherein the position detector keeps outputting one of the ON signal and the OFF signal when the zoom lens is driven between the first position and the second position by the driving device, and wherein an outputting region in which the position detector keeps outputting said one signal is sufficiently larger than an outputting region in which the position detector keeps outputting each of the ON signal and the OFF signal when the zoom lens is driven between the second position and the third position.

7. The apparatus as claimed in claim 6, wherein the position detector outputs one of the ON signal and the OFF signal when the zoom lens is driven between the first position and the second position, and wherein the position detector outputs the other thereof when the zoom lens is driven in a moving region including the third position.

8. The apparatus as claimed in claim 6, wherein the position detector outputs one of the ON signal and the OFF signal when the zoom lens is driven between the first position and the second position, and wherein the position detector outputs the one thereof when the zoom lens is driven in a moving region including the third position.

9. The apparatus as claimed in claim 8, wherein the controller controls the driving device so as to drive the zoom lens at a relatively low speed for resetting the zoom lens to the initial position thereof, when the position detector outputs the one thereof in correspondence with a state in which the zoom lens is driven in one of a moving region between the first position and the second position, and the moving region including the third position, and wherein the controller controls the driving device so as to drive the zoom lens at a relatively high speed for resetting the zoom lens to the initial position thereof, when the position detector outputs the signal in correspondence with a state in which the zoom lens is driven in a moving region between the second position and the moving region including the third position.

10. An apparatus comprising:

a driving mechanism for driving a zoom lens;

a position detector for outputting a signal which alternates between a first state and a second state a plurality of times over the range of movement of the lens, in correspondence with a position of the zoom lens; and a controller for controlling the driving mechanism in response to the signal with the first state and the signal with the second state that are output from the position detector, wherein the controller controls the driving mechanism to reset the zoom lens to an initial position of the zoom lens, so that the zoom lens is driven in a first direction in which the zoom lens is moved when the signal with the first state is output from the position detector, and so that the zoom lens is driven in a second direction in which the zoom lens is moved when the signal with the second state is output therefrom.

11. The apparatus as claimed in claim 10, wherein the first direction is a direction in which there arises a change between the first state and the second state before the zoom lens reaches one end part of a moving field within which the zoom lens is driven to move, and wherein the second direction is a direction in which there arises a change between said states before the zoom lens reaches the other end part thereof.

12. The apparatus as claimed in claim 10, wherein the position detector outputs one of the signal with the first state and the signal with the second state when the zoom lens is driven in one end part of a moving field within which the zoom lens is driven to move, and wherein the position detector outputs the other state when the zoom lens is driven in the other end part thereof.

13. The apparatus as claimed in claim 10, wherein the position detector outputs one of the signal with the first state and the signal with the second state when the zoom lens is driven in one end part of a moving field within which the zoom lens is driven to move, and wherein the position detector outputs said one state when the zoom lens is driven in the other end part thereof.

14. The apparatus as claimed in claim 13, wherein the controller controls the driving mechanism so as to drive the zoom lens at a relatively low speed for resetting the zoom lens to the initial position thereof, when the position detector outputs the one of the signal with the first state and the signal with the second state in correspondence with a state in which the zoom lens is positioned on the end part of the moving field, and wherein the controller controls the driving mechanism so as to drive the zoom lens at a relatively high speed for resetting the zoom lens to the initial position thereof, when the position detector outputs the signal that indicates a state in which the zoom lens is positioned between the end parts of the moving field.

15. An optical apparatus for a camera, comprising:

a zoom lens that is movable through a range of focal lengths, which range includes a plurality of zones; and a position detector that is responsive to the position of the zoom lens within said range and which outputs a signal having one binary state when the zoom lens is in one part of each of said zones and outputs a signal having a complementary binary state when the zoom lens is in another part of each of said zones.

16. The optical apparatus of claim 15, further including:

a driving device that moves the zoom lens within said range; and a controller that controls the driving device in accordance with the state of the signal output from the position detector.

17. The optical apparatus of claim 16 wherein said controller controls the driving device to reset the lens to an initial position, wherein the driving device moves the lens in a first direction when the output signal from said position detector is in one of said binary states, and moves the lens in a second, opposite direction when the output signal is in the other of said binary states.

18. The optical apparatus of claim 16 wherein said position detector also outputs a signal having said one binary state at each end of the range of movement of said lens, and wherein said driving device moves said lens at a relatively slow speed to reset the zoom lens when the lens is positioned near one of the ends of its range of movement, and moves said lens at a relatively high speed to reset the zoom lens when the lens is at a position away from either end of its range of movement.

* * * * *